ус008787026B2

(12) United States Patent
Tachikawa (10) Patent No.: US 8,787,026 B2
(45) Date of Patent: Jul. 22, 2014

(54) ELECTRONIC APPARATUS

(75) Inventor: Tadanori Tachikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 148 days.

(21) Appl. No.: 13/401,657

(22) Filed: Feb. 21, 2012

(65) Prior Publication Data

US 2012/0212916 A1    Aug. 23, 2012

(30) Foreign Application Priority Data

Feb. 22, 2011    (JP) .................................. 2011-036313

(51) Int. Cl.
*H05K 5/00* (2006.01)
*G06F 1/16* (2006.01)
*G06F 1/18* (2006.01)

(52) U.S. Cl.
CPC .............. *G06F 1/1626* (2013.01); *G06F 1/184* (2013.01)
USPC .......................................... 361/752; 361/807

(58) Field of Classification Search
USPC ......... 361/728–730, 752, 796, 800, 807, 809, 361/810
See application file for complete search history.

(56) References Cited

U.S. PATENT DOCUMENTS

| | | | | |
|---|---|---|---|---|
| 5,455,743 A * | 10/1995 | Miyajima ..................... | 361/781 |
| 5,672,844 A * | 9/1997 | Persson et al. ................ | 174/387 |
| 6,100,484 A * | 8/2000 | Houze et al. .................. | 200/512 |
| 6,733,327 B2 * | 5/2004 | Sugimoto et al. ............. | 439/500 |
| 7,184,846 B2 * | 2/2007 | Albright et al. ................. | 700/36 |
| 7,499,284 B2 * | 3/2009 | Kawanobe et al. ........... | 361/752 |
| 8,223,504 B2 * | 7/2012 | Kotani .......................... | 361/753 |
| 8,427,838 B2 * | 4/2013 | Hsieh et al. ................... | 361/759 |
| 2010/0140073 A1 | 6/2010 | Lee | |

FOREIGN PATENT DOCUMENTS

| JP | 02-148597 U | 12/1990 |
|---|---|---|
| JP | 08-017284 A | 1/1996 |
| JP | 08-148054 | 6/1996 |
| JP | 2001-082007 | 3/2001 |
| JP | 2006-211581 A | 8/2006 |
| JP | 2010-136366 A | 6/2010 |

OTHER PUBLICATIONS

Office Action of Japanese Patent Application No. 2011-036313 dated May 20, 2014 with Partial Translation.

* cited by examiner

*Primary Examiner* — Hung S Bui
(74) *Attorney, Agent, or Firm* — Maschoff Brennan (57) ABSTRACT

An electronic apparatus includes a housing, a printed substrate and a holder. The housing includes a front surface, a back surface, and a side surface which connects between the front surface and the back surface. The side surface includes an opening. The printed substrate includes a first surface on which a switch is mounted and a second surface which is on the reverse side of the first surface. The holder includes a holding portion and an operating portion, the holding portion is configured to hold the printed substrate under the first surface of the printed substrate facing the side surface of the housing, the operating portion is integrally formed in the holder and is exposed from the opening.

6 Claims, 10 Drawing Sheets

ELECTRONIC APPARATUS

CROSS-REFERENCE TO RELATED APPLICATIONS

This application is based upon and claims the benefit of priority from the prior Japanese Patent Application No. 2011-36313 filed on Feb. 22, 2011, the entire contents of which are incorporated herein by reference.

FIELD

The embodiments discussed herein are related to an electronic apparatus.

BACKGROUND

The electric apparatus includes a switch that is pressed by operating an operation button, a printed substrate mounted with the switch, and a housing that has an opening portion exposing the operation button and stores the printed substrate.

There is a thin housing as the housing included in the above-described electric apparatus. The thin housing includes a front surface, a back surface, and a side surface of which the area is smaller than each area of the front surface and the back surface. The above-described operation button is provided on the side surface of the housing. If the printed substrate mounted with the switch for the operation button is located parallel to the front surface or the back surface of the housing, the space occupied by the printed substrate in a direction of the front surface or the back surface inside the housing increases.

SUMMARY

According to an aspect of the invention, an electronic apparatus includes a housing, a printed substrate and a holder. The housing includes a front surface, a back surface, and a side surface which connects between the front surface and the back surface. The side surface includes an opening. The printed substrate includes a first surface on which a switch is mounted and a second surface which is on the reverse side of the first surface. The holder includes a holding portion and an operating portion, the holding portion is configured to hold the printed substrate under the first surface of the printed substrate facing the side surface of the housing, the operating portion is integrally formed in the holder and is exposed from the opening.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

Additional aspects and/or advantages will be set forth in part in the description which follows and, in part, will be apparent from the description, or may be learned by practice of the various embodiments.

DESCRIPTION OF EMBODIMENTS

An aspect of the present embodiment is to provide an electric apparatus in which an occupancy space inside a housing of a printed substrate mounted with a switch is restricted.

Figure 1A:
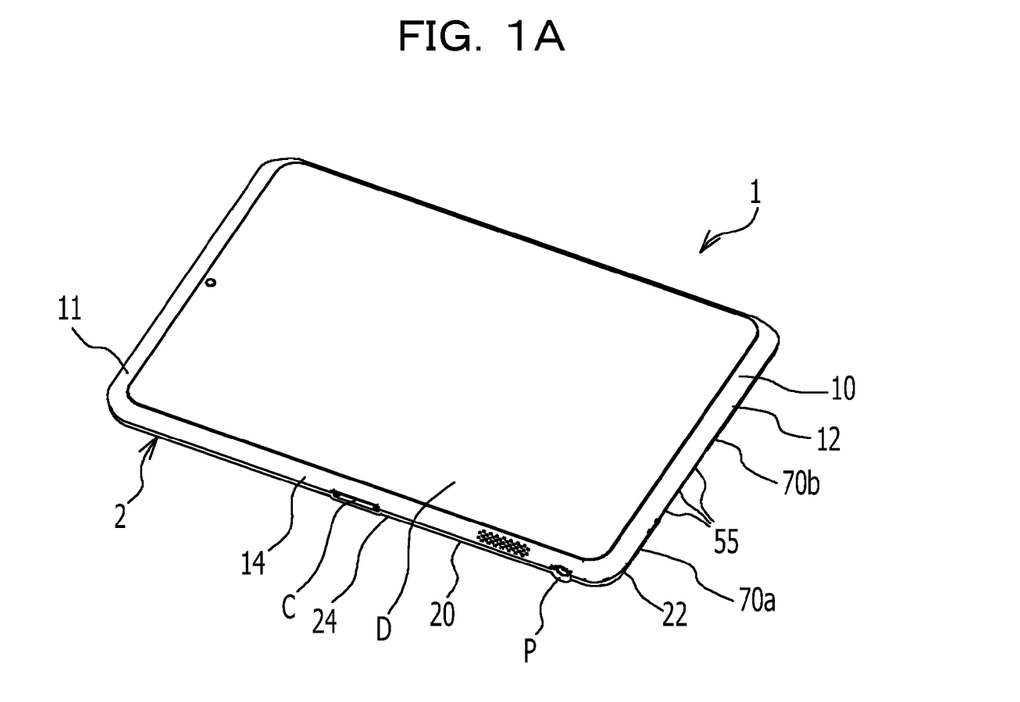
FIG. 1A and FIG. 1B are explanatory diagrams of a mobile device according to an embodiment.
Figure 1B:
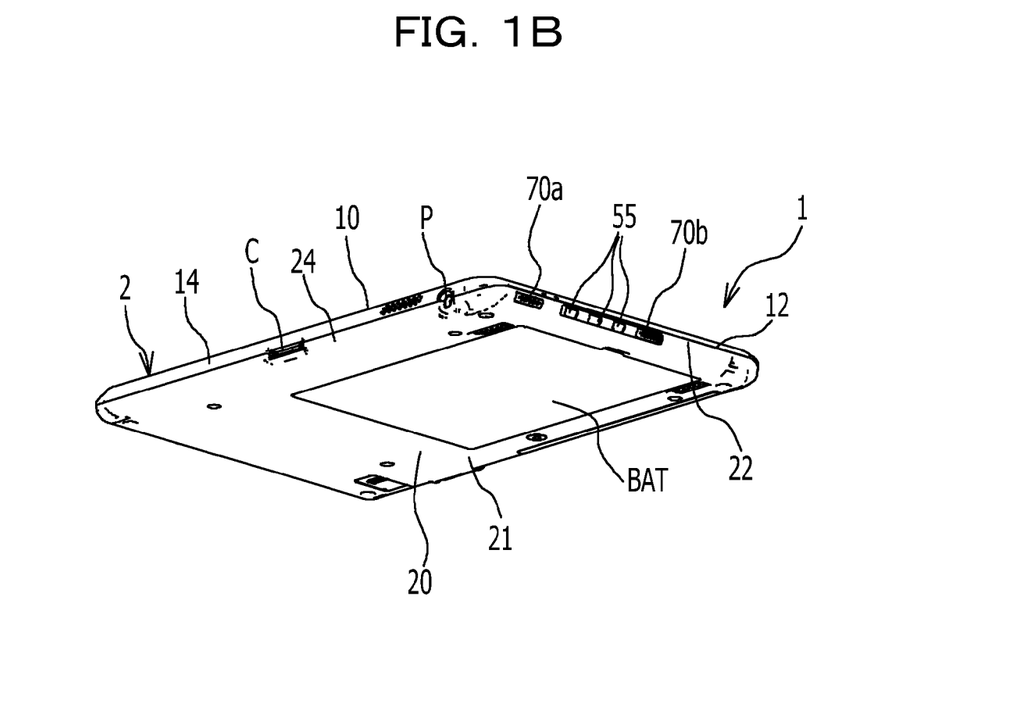

An electronic apparatus according to the present embodiment will be described. FIG. 1A and FIG. 1B are explanatory diagrams of an electronic apparatus 1 according to the present embodiment. The electronic apparatus 1 is a portable tablet computer, for example. The electronic apparatus includes a housing 2. The housing 2 includes a front case 10 (hereinafter referred to as a case) and a rear case (hereinafter referred to as a case) 20. Both the case 10 and the case 20 are formed, for example, of magnesium alloy for the purpose of light weight and robustness. The case 10 demarcates the front surface side of the housing 2. The case 20 demarcates the back surface side of the housing 2. A touch panel display D is provided on a front surface 11 of the case 10. A connector C and a port P are provided on a side surface 14 of the case 10 and a side surface 24 of the case 20. The connector C is used to couple the electronic apparatus 1 to a coupleable cradle. The port P is coupled to a cable.

Operating portions 70a and 70b, which are slidable, and three operating portions 55, which are pressed down, are provided on a side surface 12 of the case 10 and a side surface 22 of the case 20. The total area of the side surfaces 12 and 22 is smaller than each area of the front surface 11 and the back surface 21. The side surface 12 is slanted relative to the front surface 11. The side surface 22 is curved. A battery pack BAT is detachably mounted on the back surface 21 of the case 20. The battery pack BAT includes a connector that is electrically coupled to the connector of the electronic apparatus 1, a battery cell that supplies power to the electronic apparatus 1 through the connector, and a case that stores the battery cell. When the battery pack BAT is mounted on the housing 2, a part of the case of the battery pack BAT configures the back surface of the housing 2 in cooperation with the back surface 21 of the case 20.

Figure 2:
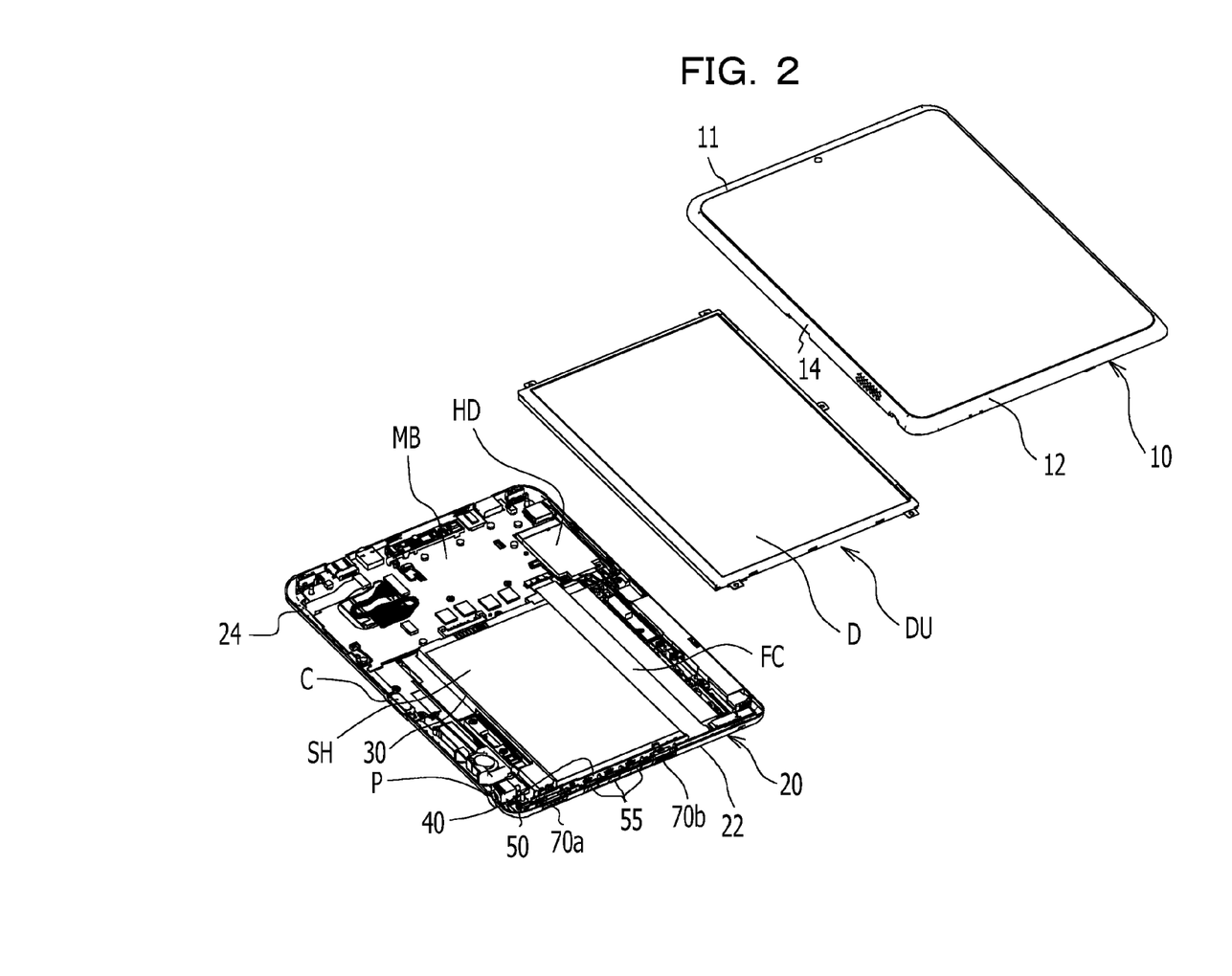
FIG. 2 is an exploded perspective diagram of an electronic apparatus.

FIG. 2 is an exploded perspective diagram of the electronic apparatus 1. The case 10 and the case 20 store a display unit DU, a mother board MB, a hard disk HD, a metallic plate 30, a printed substrate 40, a holder 50, and the like. The display unit DU is located on the side of the case 10 in a storage space formed by the case 10 and the case 20. The mother board MB, the hard disk HD, the metallic plate 30, and the printed substrate 40 are located on the side of the case 20 in the storage space. An IC chip that controls the operation of the electronic apparatus 1 and a memory are mounted on the mother board MB.

Switches mounted on the printed substrate 40 will be described below in detail. The holder 50 holds the printed substrate 40. The mother board MB is electrically coupled to the printed substrate 40 through a flat cable FC. The printed substrate 40 and the holder 50 are located between the metallic plate 30 and the side surface 22 of the case 20. The battery pack BAT is stored on the side of the back surface of the metallic plate 30. A sheet SH made of rubber is attached on the front surface of the metallic plate 30. The front surface of the metallic plate 30 has a plurality of holes for the purpose of light weight. The sheet SH blocks the holes of the metallic plate 30.

Figure 3:
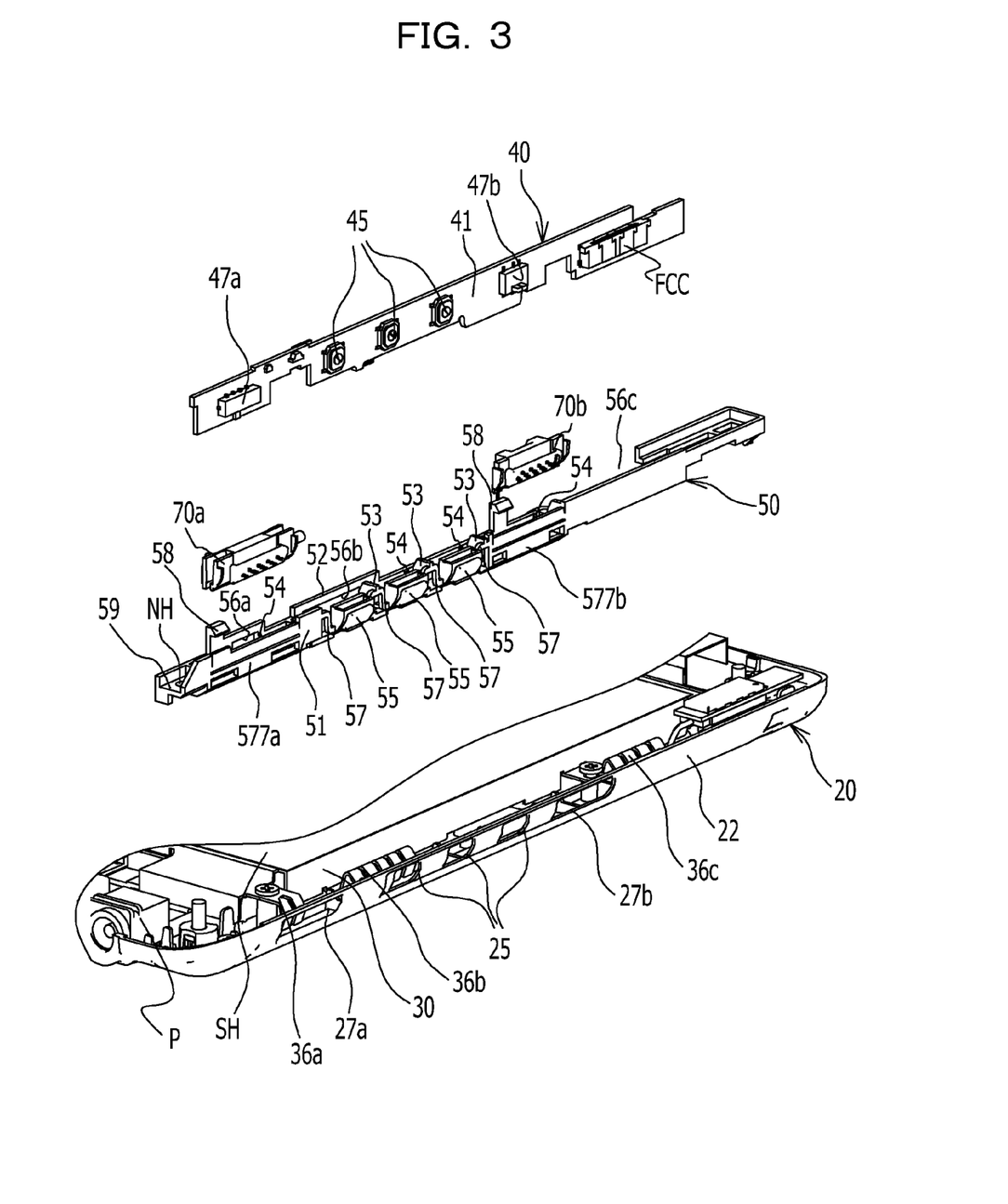
FIG. 3 is an exploded perspective diagram of a case, a printed substrate, and a holder.
Figure 4:
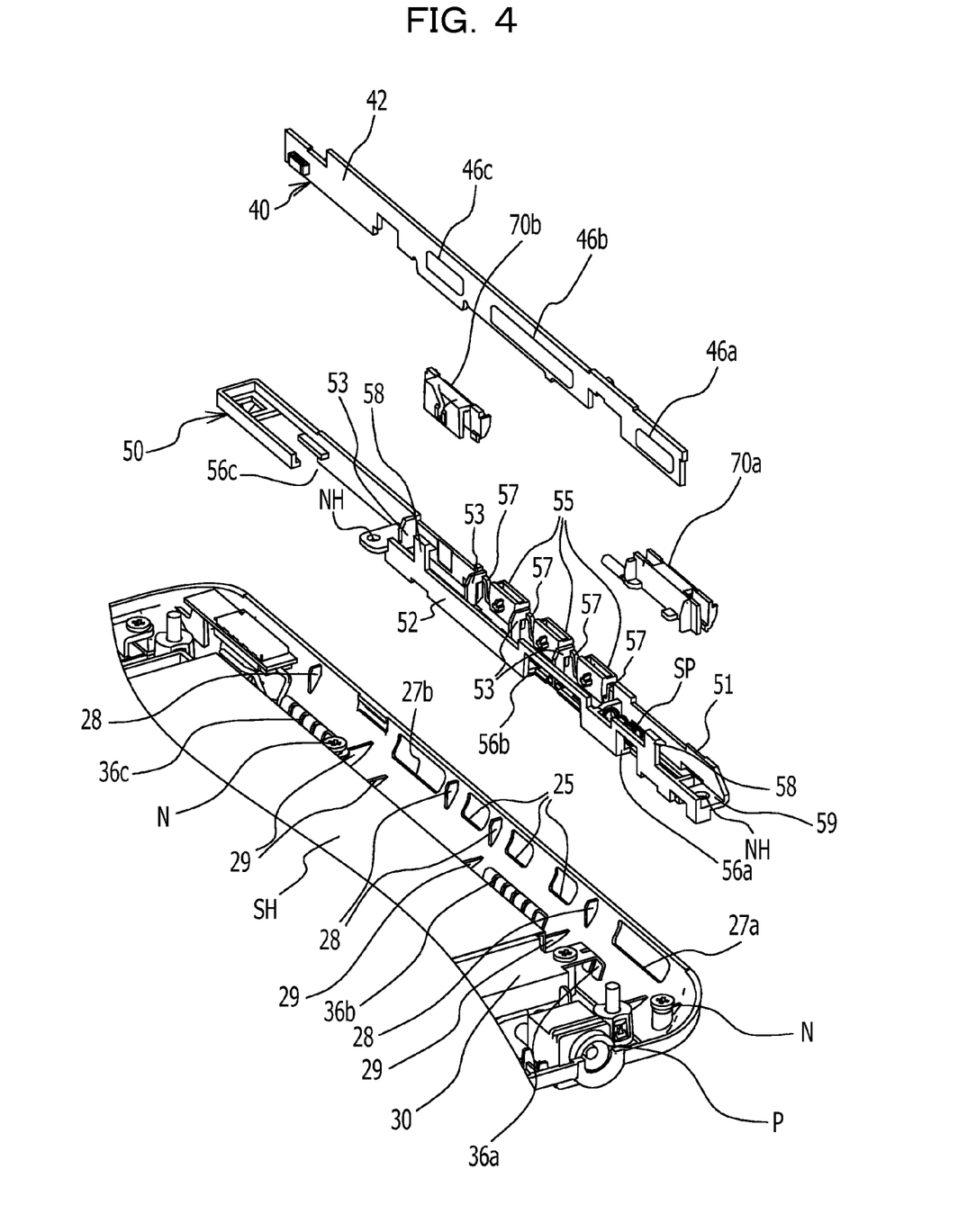
FIG. 4 is an another exploded perspective diagram of a case, a printed substrate, and a holder.

FIG. 3 and FIG. 4 are exploded perspective views illustrating the case 20, the printed substrate 40, and the holder 50. The printed substrate 40 includes a first surface 41 and a second surface 42 corresponding to a reverse surface of the first surface 41. The first surface 41 is mounted with a switch 45, a switch 47a, and a switch 47b. Ground patterns 46a to 46c are formed on the second surface 42. The holder 50 holds the printed substrate 40 in such a way that the first surface 41 faces the side surface 22 of the case 20 and that the second surface 42 faces the metallic plate 30. The switch 45 is a touch-tone switch. The switches 47a and 47b are sliding switches. The printed substrate 40 has stiffness. A connector FCC to be coupled to the flat cable FC is mounted on the first surface 41. The ground patterns 46a to 46c are conducted to a ground layer of the printed substrate 40.

The holder 50 holds the printed substrate 40. The holder 50 is integrally provided with the operating portion 55 that operates the switch 45. The operating portions 70a and 70b are provided separately from the holder 50. The holder 50 includes side wall portions 51 and 52 that are facing each other and a lower wall portion 59 that continues the side wall portions 51 and 52. Furthermore, a first holding portion (hereinafter referred to as a holding portion) 53 is provided in the side wall portion 51. A second holding portion (hereinafter referred to as a holding portion) holding portion 54 is provided in the side wall portion 52. The holding portions 53 and 54 are facing each other while a prescribed space is set therebetween.

When the printed substrate 40 is assembled to the holder 50, the side wall portions 51 and 52 are opposing to the first surface 41 and the second surface 42 of the printed substrate 40, respectively. In this case, the holding portions 53 and 54 are opposing to the first surface 41 and the second surface 42 of the printed substrate 40, respectively. The lower wall portion 59 of the holder 50 is coupled to the rim of the lower side of the printed substrate 40 to support the printed substrate 40. An engaging claw portion 58 that presses the rim of the upper side of the printed substrate 40 is formed on the side wall portion 52.

Engaging portions 577a and 577b that slidably engage the operating portions 70a and 70b are formed on the side wall portion 51. A screw hole NH is formed in the holder 50. By using the screw hole NH, the case 20 is secured to the holder 50 with a screw N. The coupling portions 36a to 36c of the metallic plate 30 described below and recess portions 56a to 56c that secure coupling to the printed substrate 40 are formed in the side wall portion 52 of the holder 50. The holder 50 is formed of synthetic resin to be deformable.

Two arm portions 57 are continuously provided with respect to a single operating portion 55. The arm portion 57 is curved. According to the present embodiment, the arm portions 57 may be formed to continue to the side wall portion 51, and the arm portions 57 may also be continuously formed to the holding portion 53.

The opening portions 25, 27a, and 27b are formed on the side surface 22 of the case 20. The opening portions 25, 27a, and 27b expose the operating portions 55, 70a, and 70b, respectively. Ribs 28 and 29 are formed on the inner surface of the side surface 22 of the case 20. The ribs 28 and 29 support the holder 50. The ribs 28 and 29 support the holder 50 by being coupled to the side wall portion 51 and the lower wall portion 59 of the holder 50, respectively. As illustrated in FIG. 4, the holder 50 holds a coil spring SP. The coil spring SP is used to put back the operating portion 70a to the initial position.

The metallic plate 30 includes coupling portions 36a to 36c. The coupling portions 36a to 36c are coupled to the ground patterns 46a to 46c of the printed substrate 40, respectively. The coupling portions 36a to 36c are formed in a leaf spring shape that is curved to be elastically deformable.

Figure 5:
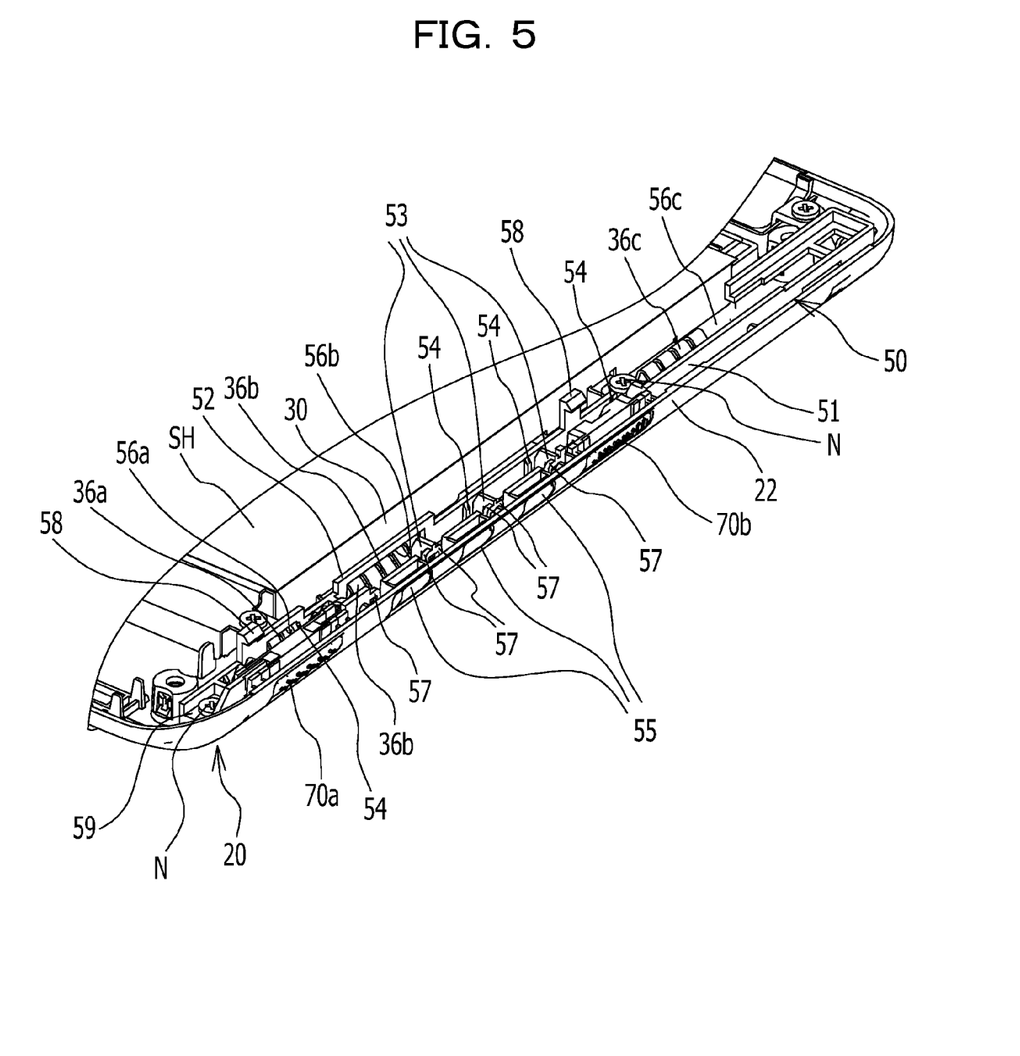
FIG. 5 is a diagram of the holder that is secured to the case.
Figure 6:
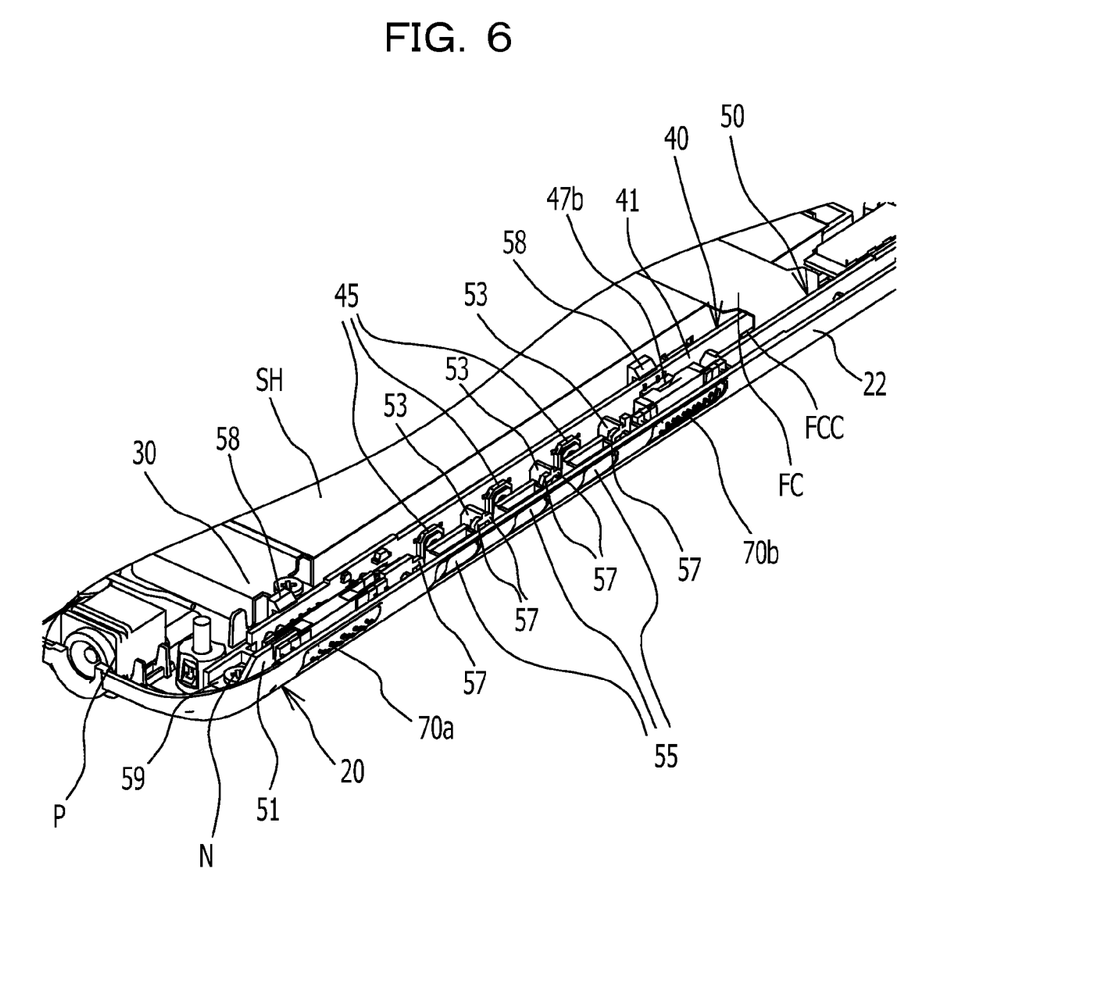
FIG. 6 is a diagram of the holder secured to the case holds the printed substrate.
Figure 7:
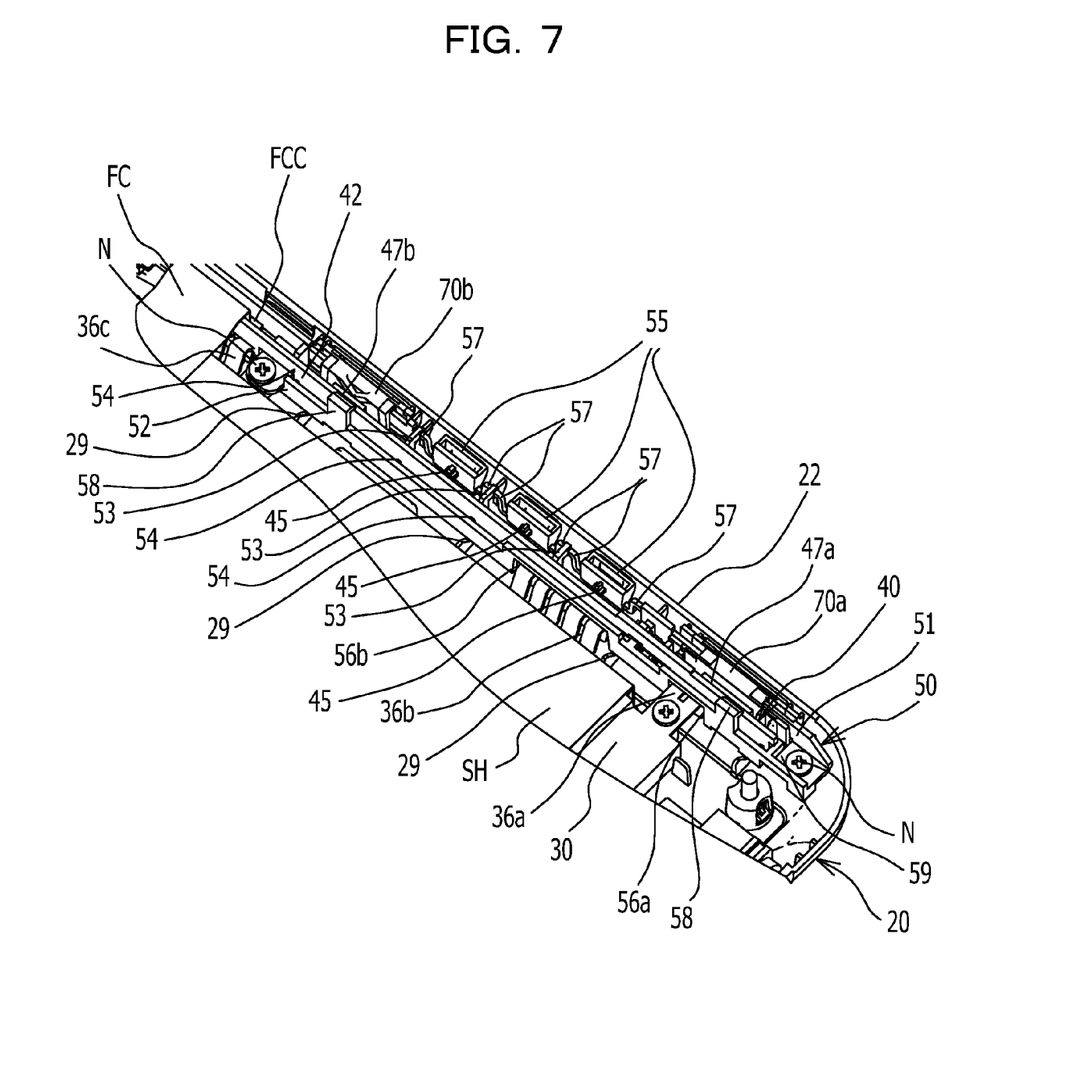
FIG. 7 is another diagram of the holder secured to the case holds the printed substrate.
Figure 8:
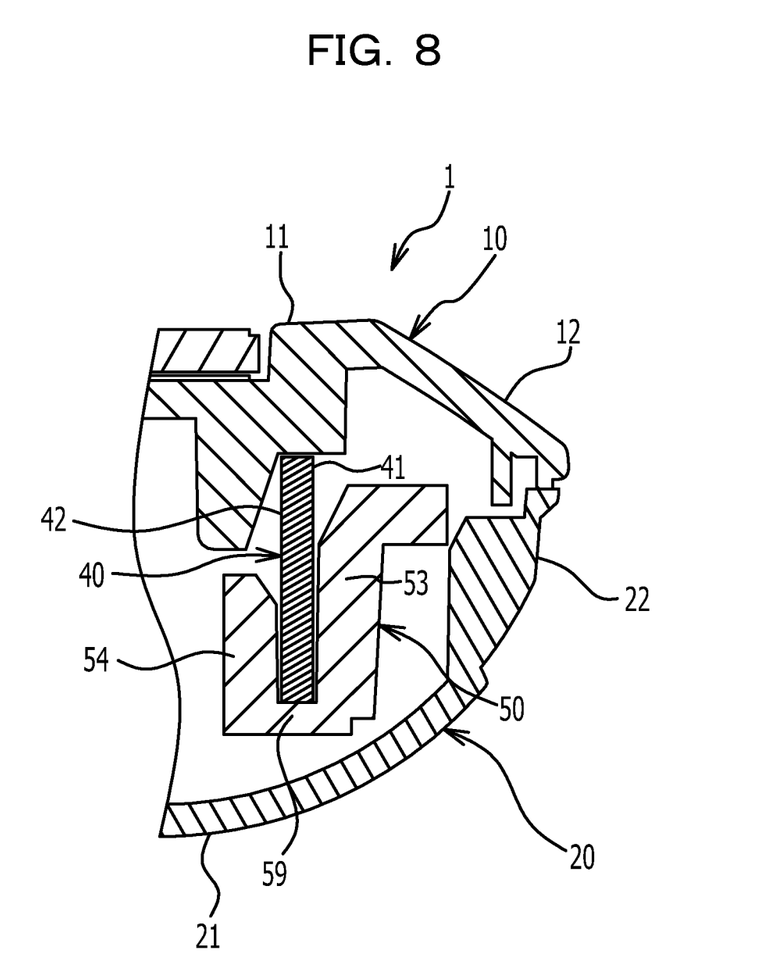
FIG. 8 is a cross-section diagram of the printed substrate of an assembled electronic apparatus and a periphery of the holder.
Figure 9:
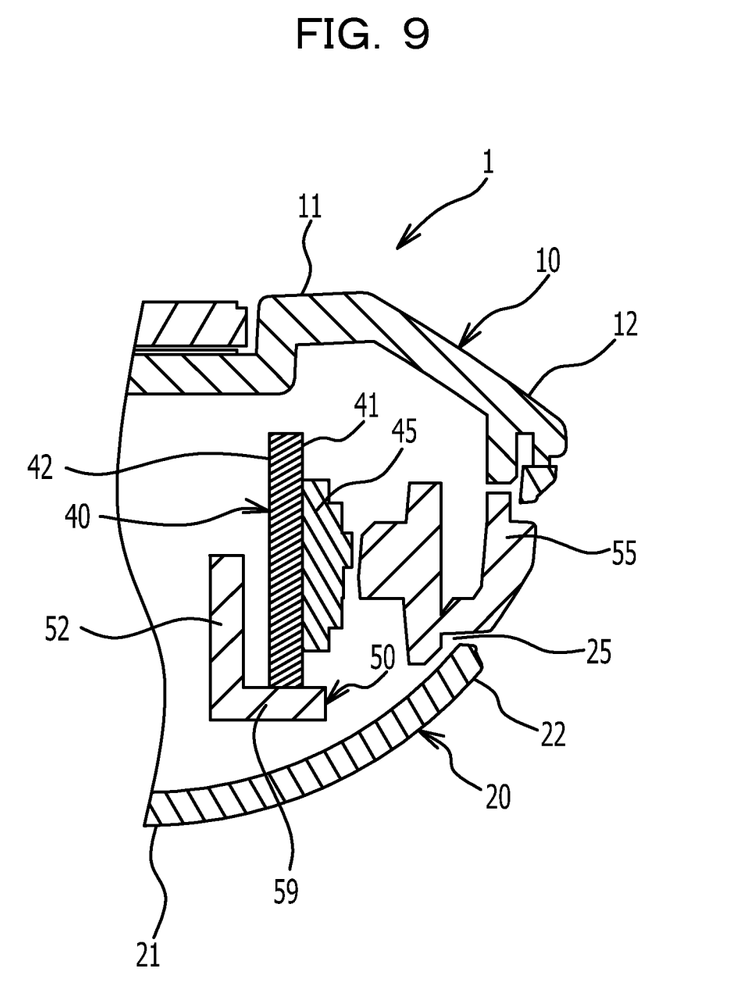
FIG. 9 is another cross-section diagram of the printed substrate of the assembled electronic apparatus and the periphery of the holder.
Figure 10:
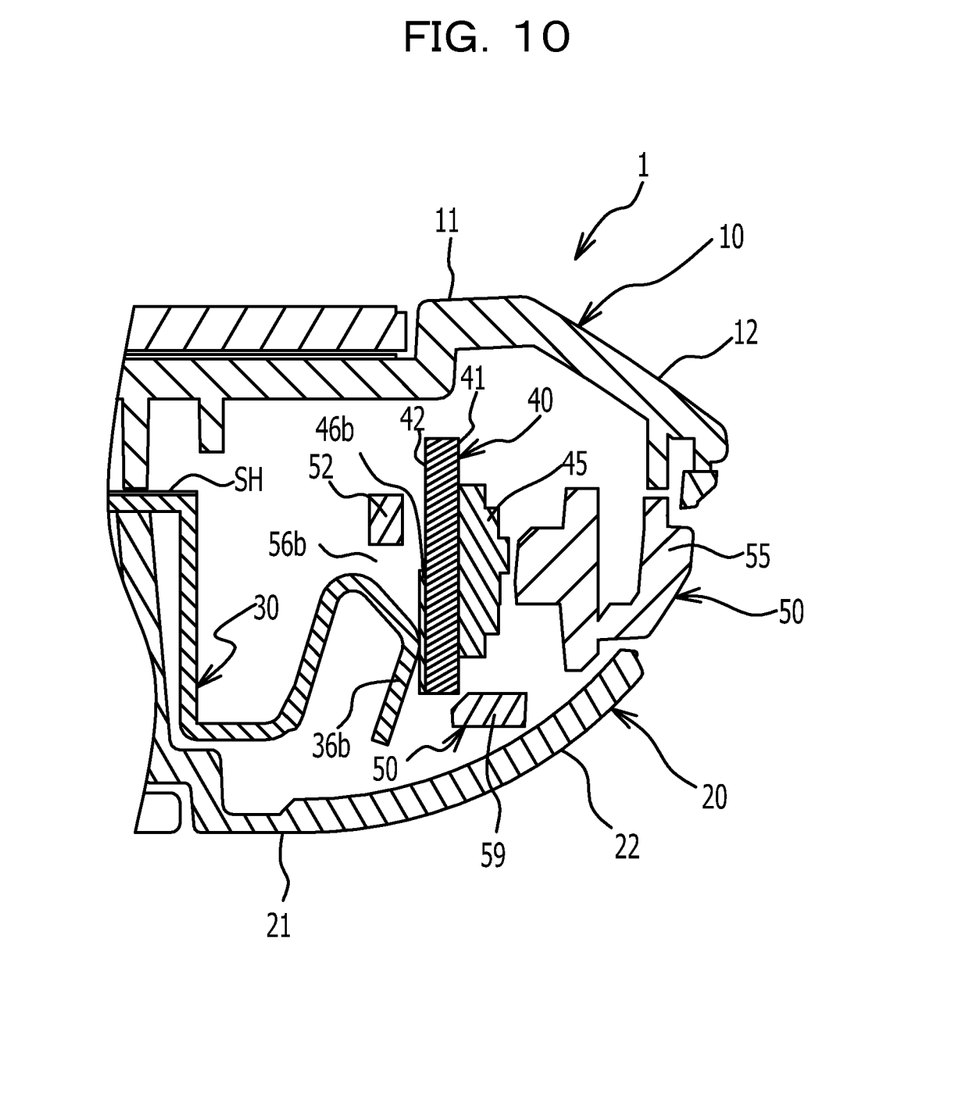
FIG. 10 is another cross-section diagram of the printed substrate of the assembled electronic apparatus and the periphery of the holder.

FIG. 5 is a diagram illustrating the holder 50 that is secured to the case 20. The holder 50 is located along the side surface 22 of the case 20. FIG. 6 and FIG. 7 are diagrams of the holder 50 secured to the case 20 that holds the printed substrate 40. FIGS. 8 to 10 are cross-section diagrams of the printed substrate 40 and the periphery of the holder 50 of the assembled electronic apparatus 1.

As illustrated in FIGS. 6 and 7, the first surface 41 of the printed substrate 40 faces the side surface 22. In other words, the first surface 41 is perpendicular to the front surface 11 and the back surface 21 of the housing 2. As described above, the holder 50 holds the printed substrate 40 while the first surface 41 faces the side surface 22 of the case 20. When the first surface 41 of the printed substrate 40 is located to face the front surface 11 of the case 10, the first surface 41 occupies the space in the plane direction inside the housing 2 for the space size in the plane direction of the printed substrate 40. However, in the electronic apparatus 1 according to the present embodiment, the printed substrate 40 is located in such a way that the first surface 41 of the printed substrate 40 faces the side surfaces 12 and 22 of the housing 2. Thus, the space of the printed substrate 40 occupies simply the thickness of the printed substrate 40 in the flat surface direction inside the housing 2. Therefore, the space occupied by the printed substrate 40 in the flat surface direction inside the housing 2 is restricted.

As illustrated in FIG. 2, particularly in the electronic apparatus 1 according to the present embodiment, the mother board MB, the metallic plate 30, and the hard disk HD occupy most of the space in the flat surface direction inside the housing 2. In other words, each area of the mother board MB and the metallic plate 30 is larger than the area of the first surface 41 of the printed substrate 40. As described above, the printed substrate 40 is located to be perpendicular to the mother board MB that occupies a larger space in the flat surface direction inside the housing 2. Accordingly, the space occupied by the printed substrate 40 in the flat surface direction of the housing 2 is restricted.

As illustrated in FIGS. 7 and 8, the holder 50 holds the printed substrate 40 in such a way that the holding portions 53 and 54 hold the printed substrate 40, the lower wall portion 59 supports the rim of the lower side of the printed substrate 40, and the engaging claw portion 58 presses the rim of the upper side of the printed substrate 40. The holding portions 53 and 54, the engaging claw portion 58, and the lower wall portion 59 of the holder 50 are given as an example of the holding portion that holds the printed substrate 40. The holding portions 53 and 54 specify the position of the printed substrate 40 in a direction where the printed substrate 40 is perpendicular to the first surface 41 of the printed substrate 40, and the engaging claw portion 58 and the lower wall portion 59 specify the position of the printed substrate 40 in the surface direction of the first surface 41 of the printed substrate 40.

As illustrated in FIG. 6, the switches 45, 47a, and 47b are positioned on the back surface of the operating portions 55, 70a, and 70b, respectively. As illustrated in FIG. 9, the switch 45 is pressed by the operating portion 55 if the operating portion 55 is pressed down. The holder 50 has a function for holding the printed substrate 40 and is integrally formed with the operating portion 55 that operates the switch 45 mounted on the printed substrate 40. As a result, the number of components is reduced.

If the operating portion 55 is pressed, the arm portion 57 is deformed and bent. That is, the arm portion 57 and the operating portion 55 support the operating portion 55 so that the operating portion 55 may be pressed down. Since the arm portion 57 is curved, the length of the arm portion 57 is secured compared to the arm portion 57 that is formed in a straight shape. Due to this, the arm portion 57 is easily bent. The two arm portions 57 are continuously provided in the operating portion 55.

As illustrated in FIG. 7, the coupling portions 36a to 36c of each metallic plate 30 are coupled to the ground patterns 46a to 46c of each printed substrates 40 through the recess portions 56a to 56c of the holder 50. As a result, if the switch 45 is pressed by the operating portion 55 that is pressed, the metallic plate 30 prevents the printed substrate 40 from being bent.

As illustrated in FIG. 7 and FIG. 10, the coupling portion 36b is positioned on the reverse side of the switch 45. Accordingly, when the operating portion 55 opposing to the coupling portion 36b through the printed substrate 40 is operated, the coupling portion 36 prevents the printed substrate 40 from being bent. The coupling portions 36a to 36 are elastically deformable, respectively. Therefore, the coupling portions 36a to 36c bias the printed substrate 40 to the side wall portion 51 of the holder 50, so that backlash of the printed substrate 40 inside the holder 50 is prevented.

The recess portions 56a to 56c are formed in the holder 50. Due to this, the metallic plate 30 is surely coupled to the printed substrate 40. The recess portions 56a and 56b are formed in a cut-out shape toward the side wall portion 52 to expose the ground patterns 46a and 46b of the printed substrate 40. The recess portion 56c is formed to expose the ground pattern 46c of the printed substrate 40.

Although the holder 50 is secured to the case 20 with the screw N, the printed substrate 40 is not secured to the case 20 but is held by the holder 50. Therefore, simply the holder 50 is secured to the case 20 with the screw N, and the printed substrate 40 is not secured with the screw N. Due to this, the printed substrate 40 is easily assembled to and detached from the holder 50. As a result, assemblability of the printed substrate 40 with respect to the holder 50 and replacement work efficiency of the printed substrate 40 held by the holder 50 are improved.

When the printed substrate 40 is assembled to the holder 50, the printed substrate 40 is inserted between the holding portion 53 and the holding portion 54 of the holder 50 in a flat surface direction and is then held by the holder 50. In this manner, the printed substrate 40 is easily assembled to the holder 50. A depressing direction of the operating portion 55 used to operate the switch 45 is different from an assembling direction of the printed substrate 40 to the holder 50.

The preferable embodiment of the present invention has been described above. However, the present invention is not limited to the specific embodiment. Various changes, substitutions, and alterations could be made hereto without departing from the spirit and scope of the invention.

According to the above-described embodiments, a tablet computer as an electronic apparatus is described, for example. The electronic apparatus is not limited to the example. For example, the electronic apparatus may be a laptop computer, a mobile phone, an electronic dictionary, a PDA, a game machine, a camera, a music player, a navigation device, and the like. The electronic apparatus may be not simply the above-described mobile device but also a fixed type electronic apparatus. For example, the electronic apparatus may be a desktop computer, a keyboard used with the desktop computer, an audio, a TV, and other electronic appliances.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An electronic apparatus comprising:
a housing including a front surface, a back surface, and a side surface which connects between the front surface and the back surface, the side surface including an opening;
a first printed substrate which includes a first surface on which a switch is mounted and a second surface which is on the reverse side of the first surface;
a second printed substrate which is stored in the housing and located vertically to the first surface of the first printed substrate; and
a holder including a holding portion and an operating portion, the holding portion is configured to hold the first printed substrate under the first surface of the first printed substrate facing the side surface of the housing, the operating portion is integrally formed in the holder and is exposed from the opening.

2. The electronic apparatus according to claim 1, further comprising:
a metallic plate which is located in the housing and includes a coupling portion, the coupling portion is coupled to a ground pattern formed on the second surface of the first printed substrate when the holder holds the first printed substrate.

3. The electronic apparatus according to claim 2, wherein the coupling portion is positioned on the reverse side of the switch.

4. The electronic apparatus according to claim 2, wherein the coupling portion is formed in a leaf spring shape to be elastically deformable.

5. The electronic apparatus according to claim 1, wherein the holder is secured to the housing, and the first printed substrate is held by the holder without being secured to the housing.

6. The electronic apparatus according to claim 1, wherein the holder includes an arm portion which is curved, is continuously formed on the holding portion and the operating portion, and is deformed by operating the operating portion.

* * * * *